Dec. 24, 1940.   R. C. H. CHUFFART   2,225,685
PROCESS OF PRODUCING ALKALINE NITRATE AND CHLORINE
Filed July 16, 1938
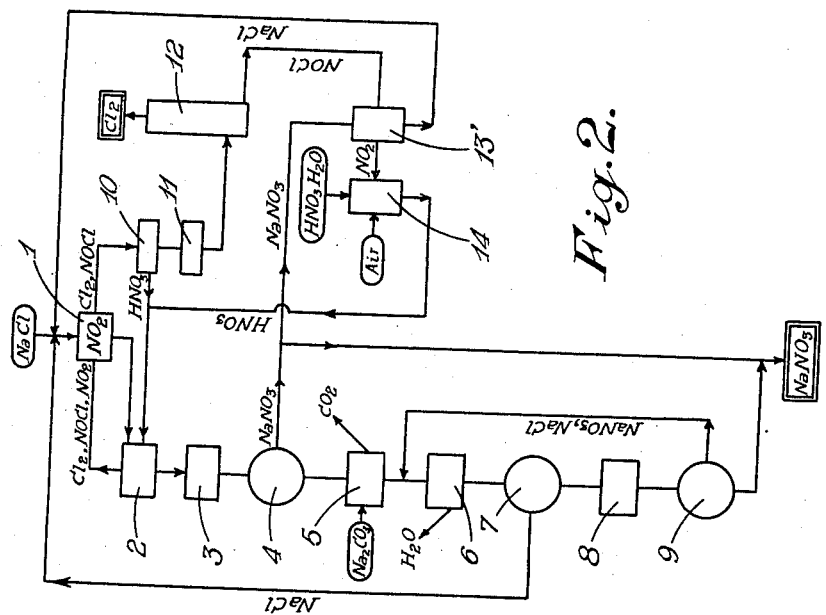
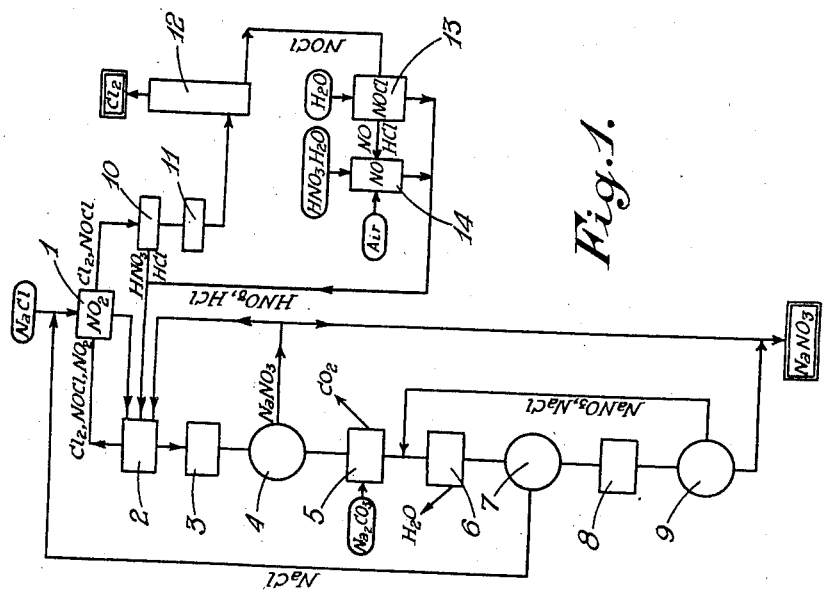
INVENTOR:
ROBERT CHARLES HENRI CHUFFART
BY Haseltine, Lake & Co.
ATTORNEYS Patented Dec. 24, 1940

2,225,685

UNITED STATES PATENT OFFICE 2,225,685

PROCESS OF PRODUCING ALKALINE NITRATE AND CHLORINE

Robert Charles Henri Chuffart, St. Gilles, Brussels, Belgium, assignor to Henry William Plucker, Brussels, Belgium Application July 16, 1938, Serial No. 219,502
In the Netherlands July 21, 1937

6 Claims. (Cl. 23—102)

This invention relates to the production of alkaline nitrate and chlorine gas from alkaline chloride and nitric acid. The reaction of alkaline chloride with nitric acid, as used in known processes, yields alkaline nitrate and gaseous products comprising chlorine gas in admixture with nitrogen oxides, either free or combined with chlorine as nitrosyl chloride (NOCl). In actual practice however, difficulties are encountered, more particularly as regards the separation of chlorine gas from nitrosyl chloride, the decomposition and the utilisation of the nitrosyl chloride, and the attainment of a high degree of conversion of the initial nitric acid into nitrate.

The objects of the present invention are to overcome these difficulties, to ensure a high degree of conversion of the nitric acid and an easy decomposition of the nitrosyl chloride, and to utilise to a full extent the products of such decomposition, so as to realise a cyclic process. The invention makes use of the observation that the gaseous products resulting from the treatment of alkaline chloride with nitric acid comprise nitrogen peroxide ($NO_2$) chlorine gas and nitrosyl chloride, and that the difficulties encountered in separating the chlorine gas from the other gases are due to the varying amounts of nitrogen peroxide in the gaseous mixture.

In accordance with this invention, before being subjected to attack by nitric acid, the alkaline chloride is brought into contact with the gaseous products ($NO_2$, $Cl_2$, NOCl) from a previous attack, in order to fix the nitrogen peroxide, thus leaving a practically equimolecular mixture of chlorine gas and nitrosyl chloride, wherefrom the chlorine is separated and the nitrosyl chloride is decomposed in a known manner, the resulting nitrogen oxides then being converted into nitric acid and returned, together with fresh nitric acid, to the cycle for renewed attack on the alkaline chloride.

The decomposition of nitrosyl chloride may be carried out by the wet process, with production of hydrochloric acid and nitrogen monoxide (NO) which, in presence of air and water, is converted into peroxide ($NO_2$) and nitric acid. The mixture of nitric and hydrochloric acids is returned to the cycle and used for attacking the initial alkaline chloride and alkaline nitrate which is brought there to react with the hydrochloric acid.

It is also possible, and of advantage for economical reasons, to subject the nitrosyl chloride to dry decomposition by contact with alkaline nitrate at high temperature, preferably above 300° C. Nitrogen peroxide and alkaline chloride are formed, which are returned separately to the reaction chamber.

In both cases the final products allowed to come out of the cycle are only alkaline nitrate and chlorine gas, so that any loss of nitrogen or chlorine in the form of low grade products is avoided.

In order to obtain a maximum degree of conversion of the nitric acid in the reaction chamber, an excess of alkaline chloride is used, so that the solution issuing from the chamber is always saturated with chloride. The nitrate formed is caused to crystallize and it is divided into two parts, one of which is collected whereas the other is caused to react either with hydrochloric acid, or with nitrosyl chloride, according to the method used for decomposing said chloride.

In the accompanying drawing, Figs. 1 and 2 are flow sheets, showing by way of example, two methods of carrying out the process according to this invention, said methods differing from each other only by the manner of decomposing the nitrosyl chloride.

In both Figs. 1 and 2, the attack of alkaline chloride for example solid sodium chloride, is carried out in chamber 2. This attack is started at ordinary temperature and it is completed at elevated temperature, after gradual heating.

The reaction may be expressed as follows:

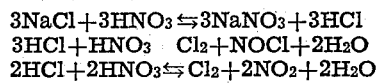

$$3NaCl + 3HNO_3 \rightleftharpoons 3NaNO_3 + 3HCl$$
$$3HCl + HNO_3 \rightarrow Cl_2 + NOCl + 2H_2O$$
$$2HCl + 2HNO_3 \rightleftharpoons Cl_2 + 2NO_2 + 2H_2O$$

Preferably an excess amount of sodium chloride is employed so that the outgoing solution is saturated with sodium chloride.

The solution which contains sodium nitrate and sodium chloride is cooled at 3, in order to crystallize the nitrate which is less soluble than the chloride. After being separated from the crystallized nitrate in filter 4, the mother liquor is neutralized with sodium carbonate at 5 and evaporated at 6. Sodium chloride crystallizes which is separated at 7, and is returned to the cycle together with fresh sodium chloride.

The remaining liquor which still contains sodium nitrate and sodium chloride is cooled at 8, where a further quantity of nitrate separates. Said nitrate is separated in filter 9 and withdrawn together with the nitrate from filter 4, while the liquor containing chloride and nitrate in solution is returned to the evaporator 6.

The gases evolved in the reaction chamber 2 comprise, as stated, NO₂, NOCl and Cl₂. After being cooled they are brought into contact in receptacle 1 with the solid sodium chloride before said chloride is subjected to treatment by nitric acid in chamber 2. The nitrogen peroxide reacts with the sodium chloride as follows:

$$NaCl + 2NO_2 = NaNO_3 + NOCl$$

The gases leaving chamber 1 are free from NO₂ and in addition to a little water vapor they contain substantially equimolecular quantities of Cl₂ and NOCl. They are cooled at 10, and the water separates in the form of a small amount of aqua regia which is returned to the reaction chamber 2. The gases are then liquefied at 11 and sent to the distillation column 12 whence pure chlorine gas is withdrawn. The separation of chlorine is made easy going to the constant composition of the liquid being distilled.

The residual nitrosyl chloride then is treated for recovering its nitrogen. In the example shown in Fig. 1, it is brought into contact with water at 13, nitrogen monoxide being formed. This gas is caused to react at 14 with air and water whereby it is converted successively into nitrogen peroxide and nitric acid. The reaction may be expressed as follows:

$$3NOCl + 2H_2O = HNO_3 + 3HCl + 2NO$$
$$2NO + air\ (O_2) = 2NO_2$$
$$2NO_2 + H_2O + air\ (\tfrac{1}{2}O_2) = 2HNO_3.$$

From chamber 14 issues a mixture of nitric acid and hydrochloric acid, which is led back to chamber 2 in order to react with the sodium chloride. In order to make up for the acid which is converted into nitrate, fresh nitric acid, which may be in form of commercial nitric acid, is introduced into chamber 14, where its concentration is increased by the absorption of the NO₂ vapors formed from the nitrosyl chloride. The resulting high HNO₃ concentration is also favorable to a high degree of conversion into nitrate in the reaction chamber 2.

In order to destroy the hydrochloric acid brought back into chamber 2 together with nitric acid, a portion of the sodium nitrate collected at 4 is led back to said chamber. The cycle thus is completed in such a way that the nitrogen compounds circulate until they take up the form of alkaline nitrate.

According to the modification represented in Fig. 2, the nitrosyl chloride from which the chlorine has been separated at 12 is sent to an oven 13', for example a revolving oven, in which it is caused to react with alkaline nitrate at a temperature preferably over 300° C., as follows:

$$NOCl + NaNO_3 = 2NO_2 + NaCl$$

The nitrate used for this reaction may be taken from the filter 4, as shown. The nitrogen peroxide produced is converted into nitric acid, at 14, by the addition of water in presence of air. The nitric acid and the sodium chloride are returned to the reaction chambers as illustrated.

An advantage of this method consists in the fact that all the nitrogen from the nitrosyl chloride and the alkaline nitrate is given off as nitrogen peroxide which is directly available for raising the nitric acid concentration. Furthermore, as water is no longer introduced for decomposing the nitrosyl chloride, the amount of water to be evaporated is reduced by about 50%. Then also, owing to the higher concentration of the nitric acid, the reaction at 2 is more completely carried out and the outgoing acid is less acid, whereby the amount of sodium carbonate used at 5 for neutralizing purposes is reduced accordingly.

With both methods described, the yields obtained are near the theoretical yield as will appear from the two following examples, which of course have no limiting character.

*Example I*

(1) I oxidise with air, in presence of 3532 kg. of a solution containing 2162 kg. of HNO₃, the gaseous products resulting from the decomposition of 923 kg. of nitrosyl chloride by water; I thus obtain 3987 kg. of solution containing 2683 kg. of HNO₃ and 10 kg. of HCl. This solution is added to the liquid resulting from the decomposition of said nitrosyl chloride and forms the attacking solution which contains 3049 kg. of HNO₃ and 514 kg. of HCl.

(2) To 1646 kg. of sodium chloride I add 899 kg. of sodium chloride recovered by filtration in the course of the process. The whole amount of salt, in the solid state, is subjected to the action of the gaseous products evolved during the attack by HNO₃. The gases thus are freed from 156 kg. of NO₂ contained therein. A solid mixture is obtained which contains 2446 kg. of sodium chloride and 144 kg. of sodium nitrate.

(3) The solution obtained under (1) is brought into contact with the solid salt mixture under (2) to which is added 1054 kg. of a solid nitrate taken from the product separated after the first crystallisation. The mixture is heated to 114° C.

(4) The resulting solution is cooled down to 25° C. A portion of the sodium nitrate crystallises. By filtration I separate 1449 kg. of nitrate from which I take 1054 kg. which are brought back to the reaction chamber as stated under (3). The liquor is neutralized by addition of 311 kg. of sodium carbonate and the resulting solution is evaporated. By filtration I separate 899 kg. of sodium chloride which are also returned to the reaction chamber. The filtrate is cooled to 25° C., and 2489 kg. of sodium nitrate are separated by filtration. The new filtrate is returned to the evaporation.

(5) The gases given off in the reaction chamber contain nitrogen peroxide which is absorbed by passing said gases over fresh salt on its way to the reaction chamber, which leaves a mixture of damp nitrosyl chloride and chlorine gas. This gaseous mixture is cooled and the water contained therein is separated in the form of a small quantity of aqua regia which is returned to the reaction chamber.

The gases then are liquefied and distilled, and 1000 kg. of pure chlorine are thus separated.

The nitrosyl chloride containing a very small amount of nonseparated chlorine is then treated with water, giving 3160 kg. of aqua regia containing 366 kg. of HNO₃ and 504 kg. of HCl.

The gases comprising NO and traces of NOCl are oxidised by air in presence of nitric acid introduced into the cycle. They are absorbed in said acid as set forth under (1). The products resulting from the decomposition of the nitrosyl chloride thus return into the cycle together with the fresh nitric acid.

(6) In short, starting from 1646 kg. of dry NaCl, 2162 kg. of HNO₃ in solution and 311 kg. of sodium carbonate used for neutralizing purposes, I obtain 1000 kg. of pure chlorine and 2884 kg. of sodium nitrate. The yield of the operation is of the order of the theoretical yield.

Example II (1) A nitric acid solution containing 2055 kg. of HNO₃ is concentrated with NO₂ obtained by decomposing 923 kg. of NOCl with 1197 kg. of NaNO₃ and air. I thus obtain a solution of nitric acid of a total weight of 5421 kg. and containing 3828 kg. of HNO₃.

(2) To 1648 kg. fresh sodium chloride I add 855 kg. of sodium chloride obtained from the decomposition of NOCl and 344 kg. of sodium chloride recovered by filtration in the course of the process. I subject the solid salt to the action of the gaseous products evolved during the attack by HNO₃. The gases thus are freed from 156 kg. of NO₂ contained therein. I obtain a solid mixture which contains 2715 kg. of NaCl and 144 kg. of NaNO₃.

(3) The solution obtained under (1) is brought into contact with the solid mixture under (2) and then heated to 119° C.

(4) The resulting solution is cooled down to 25° C. A portion of the nitrate crystallises. By filtration I separate 2555 kg. of NaNO₃. The liquor is neutralized at 20° C. by the addition of 243 kg. of Na₂CO₃ and the resulting solution is evaporated. By filtration I separate 344 kg. of sodium chloride which are returned to the reaction chamber. The filtrate is cooled to 25° C. and I separate by filtration 1392 kg. of NaNO₃ of which 1197 kg. are used for the decomposition of NOCl.

(5) The nitrogen peroxide contained in the gases given off in the reaction chamber is absorbed by the fresh salt on its way to the reaction chamber, and I thus obtain a gaseous mixture of NOCl and Cl₂ which is dried and separated as in Example I. After separation of the chlorine the nitrosyl chloride is heated in presence of solid sodium nitrate, thus producing 1295 kg. of NO₂ and 825 kg. of NaCl.

The nitrogen peroxide in presence of air is used for further concentrating the nitric acid solution as stated under (1). The products from the decomposition of NOCl are returned to the cycle together with fresh nitric acid.

(6) In short, starting from 1648 kg. of dry NaCl, 2055 kg. of HNO₃ in solution and 243 kg. of Na₂CO₃ used for neutralizing purposes, I obtain 1000 kg. of pure chlorine and 2750 kg. of NaNO₃. The yield again is near the theoretical yield.

I claim:

1. In a cyclic process of simultaneously producing alkaline nitrate and chlorine, causing solid alkaline chloride to react with concentrated nitric acid, thus producing alkaline nitrate and a gaseous mixture consisting mainly of nitrogen peroxide, chlorine and nitrosyl chloride, bringing said gaseous mixture into contact with a further charge of solid alkaline chloride before said charge is subjected to attack with nitric acid, thus causing the nitrogen peroxide to combine with some of said chloride, and leaving a gaseous mixture of nitrosyl chloride and chlorine in substantially equimolecular proportions, separating in the last mentioned gaseous mixture the chlorine from the nitrosyl chloride, decomposing the nitrosyl chloride and successively converting its nitrogen into nitrogen peroxide and nitric acid, using said nitric acid to attack alkaline chloride, withdrawing alkaline nitrate and withdrawing chlorine.

2. In a cyclic process of simultaneously producing alkaline nitrate and chlorine from alkaline chloride and nitric acid, first bringing a charge of solid alkaline chloride into contact with the gases produced during the treatment of a previous charge of alkaline chloride with nitric acid, said gases having previously been cooled then only subjecting the first mentioned charge of alkaline chloride to the action of concentrated nitric acid in a reaction room first at ordinary temperature, then at gradually elevated temperature, said gases comprising besides nitrogen peroxide which combines with some of the alkaline chloride brought into contact therewith, chlorine and nitrosyl chloride with a little water vapor, separating the chlorine from the nitrosyl chloride, decomposing the nitrosyl chloride and successively converting its nitrogen into nitrogen peroxide and nitric acid, returning said nitric acid to the reaction room, withdrawing alkaline nitrate and withdrawing chlorine.

3. In a cyclic process of simultaneously producing alkaline nitrate and chlorine, causing solid alkaline chlorine to react with concentrated nitric acid in a reaction chamber first at ordinary temperature then at gradually elevated temperature, the amount of said alkaline chloride being in excess of the amount required for the reaction so as to form alkaline nitrate dissolved in a liquor saturated with alkaline chloride at boiling temperature, the gaseous products formed in said chamber being nitrogen peroxide, chlorine and nitrosyl chloride, cooling said gaseous products and bringing them into contact with a further charge of solid alkaline chloride before the latter is reacted with nitric acid, thus causing the nitrogen peroxide to separate from the chlorine and nitrosyl chloride, then separating the chlorine from the nitrosyl chloride, decomposing the nitrosyl chloride and successively converting its nitrogen into nitrogen peroxide and nitric acid of high concentration, returning this nitric acid to the reaction chamber, thereby raising the nitric acid concentration in said chamber, withdrawing alkaline nitrate from said solution and withdrawing chlorine.

4. In a cyclic process of simultaneously producing alkaline nitrate and chlorine, causing solid alkaline chloride to react with concentrated nitric acid in a reaction chamber, thus producing an alkaline nitrate solution and a gaseous mixture of nitrogen peroxide, chlorine and nitrosyl chloride, causing the alkaline nitrate to crystallise, separating the crystallised alkaline nitrate, neutralizing the remaining solution with alkaline carbonate, evaporating said solution to crystallise alkaline chloride, separating the crystallised alkaline chloride and returning it to the reaction chamber, withdrawing alkaline nitrate from the remaining liquor and adding said liquor to the solution to be evaporated, cooling said gaseous mixture of nitrogen peroxide, chlorine and nitrosyl chloride and leading said mixture in the absence of added water vapor over solid alkaline chloride on its way to the reaction chamber to cause said nitrogen peroxide to be absorbed, separating the chlorine from the nitrosyl chloride, decomposing the nitrosyl chloride and successively converting its nitrogen into nitrogen peroxide and nitric acid, and returning this nitric acid to the reaction chamber.

5. In a cyclic process of simultaneously producing alkaline nitrate and chlorine, causing solid alkaline chloride to react with concentrated nitric acid in a reaction chamber, thus producing an alkaline nitrate solution and a gaseous mixture of nitrogen peroxide, chlorine and nitrosyl chloride, recovering the alkaline nitrate from said solution, cooling said gaseous mixture, leading said gaseous mixture over some of said solid alkaline chloride on its way to the reaction chamber to cause the nitrogen peroxide to be absorbed, liquefying the remaining mixture of chlorine and nitrosyl chloride and subjecting it to distillation to separate the chlorine therefrom, collecting aqua regia from the mixture undergoing liquefaction and returning it to the reaction chamber, treating the nitrosyl chloride with water and air to form a further quantity of aqua regia and also returning said further quantity to the reaction chamber, and returning some of said recovered alkaline nitrate to the reaction chamber.

6. In a cyclic process of simultaneously producing alkaline nitrate and chlorine, causing solid alkaline chloride to react with concentrated nitric acid in a reaction chamber, thus producing an alkaline nitrate solution and a gaseous mixture of nitrogen peroxide, chlorine and nitrosyl chloride, recovering the alkaline nitrate from said solution, cooling said gaseous mixture, leading said gaseous mixture over some of said solid alkaline chloride on its way to the reaction chamber to cause the nitrogen peroxide to be absorbed, separating the chlorine from the nitrosyl chloride, bringing said nitrosyl chloride into contact with some of said recovered alkaline nitrate at elevated temperature to form nitrogen peroxide and alkaline chloride, converting this nitrogen peroxide into nitric acid, and returning separately to the reaction chamber the nitric acid and the alkaline chloride produced from said nitrosyl chloride.

ROBERT CHARLES HENRI CHUFFART.